(12) United States Patent
Atamer et al.

(10) Patent No.: US 12,456,297 B2
(45) Date of Patent: Oct. 28, 2025

(54) SYSTEM AND METHOD FOR IDENTIFYING A LOCATION OF AN UNLOCATED SHORT TERM RENTAL USING IMAGE RECOGNITION

(71) Applicant: AVENU STR IP LLC, Wilmington, DE (US)

(72) Inventors: Allen Atamer, Toronto (CA); Tom Lee, Toronto (CA)

(73) Assignee: AVENU STR IP LLC, Wilmington, DE (US)

( * ) Notice: Subject to any disclaimer, the term of this patent is extended or adjusted under 35 U.S.C. 154(b) by 485 days.

(21) Appl. No.: 17/839,805

(22) Filed: Jun. 14, 2022

(65) Prior Publication Data

US 2022/0398839 A1    Dec. 15, 2022

Related U.S. Application Data

(60) Provisional application No. 63/210,272, filed on Jun. 14, 2021.

(51) Int. Cl.
   *G06V 10/764* (2022.01)
   *G06F 16/583* (2019.01)
   *G06V 20/10* (2022.01)

(52) U.S. Cl.
   CPC ........ *G06V 20/176* (2022.01); *G06F 16/5846* (2019.01); *G06V 10/764* (2022.01)

(58) Field of Classification Search
   CPC ...... G06V 10/70; G06V 10/82; G06F 16/951; G06Q 30/0645; G06Q 50/16; G06T 1/00; G06T 2207/20084
   See application file for complete search history.

(56) References Cited

U.S. PATENT DOCUMENTS

| | | | | |
|---|---|---|---|---|
| 8,219,558 | B1* | 7/2012 | Trandal | G06Q 50/16 |
| | | | | 707/736 |
| 10,789,278 | B1* | 9/2020 | Florance | G06F 16/9537 |
| 2009/0307168 | A1* | 12/2009 | Bockius | G06F 16/9535 |
| | | | | 706/46 |
| 2012/0066275 | A1* | 3/2012 | Gerstner | G06F 16/29 |
| | | | | 707/825 |
| 2014/0089020 | A1* | 3/2014 | Murphy | G06Q 10/02 |
| | | | | 705/5 |
| 2014/0358943 | A1* | 12/2014 | Raymond | G06Q 10/10 |
| | | | | 707/748 |
| 2016/0027307 | A1* | 1/2016 | Abhyanker | G08G 1/005 |
| | | | | 701/117 |
| 2016/0042478 | A1* | 2/2016 | Howe | G06F 16/5866 |
| | | | | 705/26.62 |
| 2016/0189065 | A1* | 6/2016 | Elliott | G06Q 30/0645 |
| | | | | 705/5 |
| 2016/0225108 | A1* | 8/2016 | Fishberg | G06Q 10/02 |

(Continued)

*Primary Examiner* — Guillermo M Rivera-Martinez
(74) *Attorney, Agent, or Firm* — Tarolli, Sundheim, Covell &Tummino LLP

(57) ABSTRACT

A system and method for identifying a location using image recognition. STR listing images are analyzed and assigned an archetype. Optionally, STR listing images are analyzed with an object detection model and associated with archetypes. The STR dwelling unit type may be determined from the combination of STR image archetypes. A location for the STR listing may then be determined by comparing to images of dwelling units retrieved from databases.

20 Claims, 12 Drawing Sheets

(11 of 12 Drawing Sheet(s) Filed in Color)

(56) References Cited

U.S. PATENT DOCUMENTS

| | | | |
|---|---|---|---|
| 2016/0267610 A1* | 9/2016 | Corbett | G06Q 30/0645 |
| 2017/0308622 A1* | 10/2017 | Thornburgh | G06Q 50/163 |
| 2018/0081949 A1* | 3/2018 | DiTomaso | G06N 7/01 |
| 2018/0329926 A1* | 11/2018 | Cordesses | G06Q 10/02 |
| 2019/0171689 A1* | 6/2019 | Kachkach | G06F 16/9038 |
| 2019/0332612 A1* | 10/2019 | Glover | G06Q 30/0623 |
| 2020/0184278 A1* | 6/2020 | Zadeh | G06N 3/044 |
| 2020/0394728 A1* | 12/2020 | Fishberg | G06Q 10/02 |
| 2021/0027332 A1* | 1/2021 | Lee | G06Q 30/0256 |
| 2021/0366015 A1* | 11/2021 | Kurosawa | G06F 16/248 |

* cited by examiner

FIGURE 11A
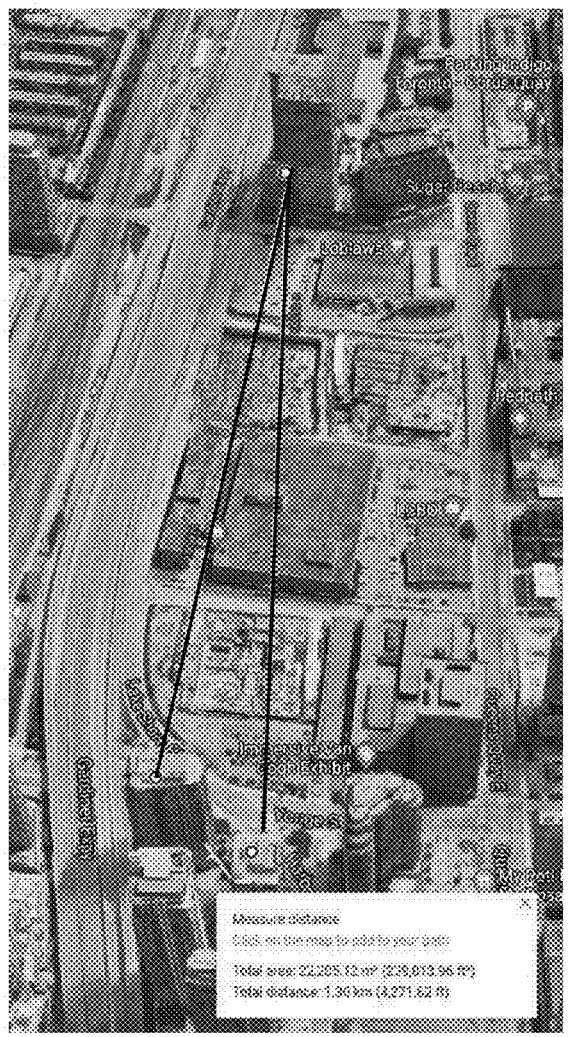
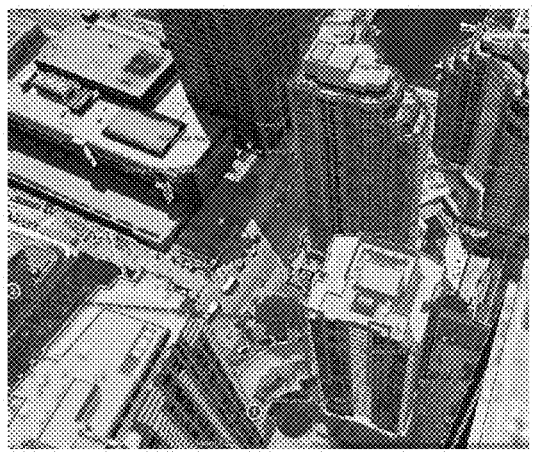
FIGURE 11C
FIGURE 11B

SYSTEM AND METHOD FOR IDENTIFYING A LOCATION OF AN UNLOCATED SHORT TERM RENTAL USING IMAGE RECOGNITION

CROSS REFERENCES TO RELATED APPLICATIONS

This application claims the benefit of U.S. Provisional Application 63/210,272, filed Jun. 14, 2021, the entirety of which is incorporated herein by reference in its entirety.

FIELD OF THE INVENTION

The present specification relates generally to a system and method of identifying location, and more particularly to a system and method of identifying location using image recognition.

BACKGROUND OF THE INVENTION

The following includes information that may be useful in understanding the present disclosure. It is not an admission that any of the information provided herein is prior art nor material to the presently described or claimed inventions, nor that any publication or document that is specifically or implicitly referenced is prior art.

The proliferation in recent years of various applications and websites enabling the provision of short-term rental (STR) units, including houses, condominiums ("condos"), apartments and individual rooms, has demonstrated itself as a boon to parties seeking primary or supplemental income. STR is generally considered to encompass a rental period of less than 31 consecutive days (or one month) per occupant stay. However, at the same time, this proliferation has created challenges for government entities seeking to monitor STR unit activity, such as for collecting taxes, protecting housing and rental stock, and enforcing regulations related to STR units.

A known challenge is the proper identification of STR units. Another challenge is the prevalence of duplicate listings across the same or multiple platforms for providing STR units. Accordingly, deduplication of collected data is important in ensuring proper identification of STR units can be made for the purpose of the monitoring activities as discussed above.

One potential method for deduplication of collected data is via image recognition, as that majority of STR unit advertisements include one or more images of the STR unit in question. However, present technology levels have resulted in this image recognition being performed by human analysts, which creates issues of quality control and scalability, especially as larger data sets are analyzed. These issues suggest an opportunity that may be addressed through the application of machine-based analysis incorporating machine learning, which may bring improvements in accuracy and speed.

Accordingly, there remains a need for improvements in the art to address the noted challenges.

SUMMARY OF THE INVENTION

A motivation for the disclosed system and method is that the STR listing intentionally obscures information about the location of the unit. For example, the STR listing usually shows an approximate location within an area for the STR. Often, this approximate area or region is shown graphically on a map. This allows the owner of the listing to maintain some anonymity until a guest has made a deposit or payment. This allows the guest to determine approximately if the STR is in the area that they would like to stay in. And, for the company providing the STR service, it allows for the transaction to rent or use the STR to be completed through their service so that they can collect the fees for operating the service (also known as a booking facilitator). Additionally, the STR listing may limit and remove all personally identifiable information and contact details. Furthermore, this means that in most images of the STR, it is unlikely to find full street numbers with street names or full addresses, although partial information may be available. For buildings such as condominiums and apartments, the STR listing may identify a cluster of buildings but will not indicate which specific building and/or specific unit.

In an aspect, the method for identifying a location using image recognition comprises: receiving an unlocated short term rental (STR) query, the unlocated STR query having an unlocated image associated with the unlocated STR; analyzing the unlocated image to assign an unlocated image archetype to the unlocated image; retrieving a list of candidate locations from a candidate data source using the unlocated image, the candidate location having a candidate location image, and the candidate location image assigned a candidate location image archetype by analyzing the candidate location image; comparing the unlocated image and the candidate location image with the same image archetype for generating a matching score; and determining the location of the unlocated STR by using the candidate location when the matching score is over a threshold;

In an embodiment, the method may further comprise, at the step of analyzing the image, assigning the archetype of the image by classifying the image using a machine learning framework for image archetype classification. In another embodiment, the method may further comprise, at the step of analyzing the image, analyzing the image with an object detection model, the object detection model for applying an object recognition algorithm to detect one or more objects within the image; and assigning an archetype to the image based on the detected objects within the image.

In another embodiment, the unlocated STR query may further contain an initial longitudinal and latitudinal search coordinate, and an area of search related to the initial search coordinate; and the retrieving of the candidate location may be limited to locations within the area of search. The method may further comprise retrieving an initial candidate location through a reverse geocoding application programming interface (API) and the initial search coordinate and retrieving of the candidate location from the data source also uses the initial candidate location.

In another embodiment the method may further comprise determining a dwelling unit type of the unlocated STR query from the archetype assigned to the unlocated image and retrieving a candidate location limited to the candidate locations with the same candidate dwelling unit type.

In another embodiment, the method may further comprise extracting text and metadata from the image and retrieving of the candidate location from the data source also uses the extracted text and metadata.

In another embodiment, the method may further comprise determining a number of floors for a building object in the image, by using a Fourier transform to extract the period of repeating floors for the building object from the image and wherein a floor or a height of the observation point of the image is determined from the number of floors for the building object in the image.

In another embodiment, the method may further comprise, identifying two or more landmark objects in the image and triangulating the candidate location of the image from the two or more landmark objects in the image.

In another aspect, there is provide a system for identifying a location using image recognition, comprising: a comparison view component operative to provide a view and interface for comparing image information about an unlocated STR unit and to identify a location for the unlocated STR unit, wherein the comparison view component receives an unlocated short term rental (STR) query, the unlocated STR query having an unlocated image associated with the unlocated STR; a photo classification component operative to analyze the unlocated image to assign an unlocated image archetype to the unlocated image; a reverse photo search component to retrieve images and wherein the system is operative to retrieve a list of candidate locations from a candidate data source using the unlocated image, the candidate location having a candidate location image, and the candidate location image assigned a candidate location image archetype by analyzing the candidate location image; wherein the system is further operative to compare the unlocated image and the candidate location image with the same image archetype for generating a matching score; and wherein the system is operative to determine the location of the unlocated STR by using the candidate location when the matching score is over a threshold.

In another alternate embodiment, the photo classification component may be further operative to assign the archetype of the image by classifying the image using a machine learning framework for image archetype classification.

In another alternate embodiment, the photo classification component may further comprise an object detection model, the object detection model for applying an object recognition algorithm to detect one or more objects within the image and further assigns an archetype to the image based on the detected objects within the image.

In another alternate embodiment, the unlocated STR query may further contain an initial longitudinal and latitudinal search coordinate, and an area of search related to the initial search coordinate; and retrieving of the candidate location is limited to locations within the area of search. The system may further comprise retrieving an initial candidate location through a reverse geocoding application programming interface (API) and the initial search coordinate and retrieving of the candidate location from the data source also uses the initial candidate location.

In another alternate embodiment, the system of may further comprise determining a dwelling unit type of the unlocated STR query from the archetype assigned to the unlocated image and retrieving a candidate location is limited to the candidate locations with the same candidate dwelling unit type.

In another alternate embodiment, the system may further comprise a metadata extraction component operative for assigning location information to images and the system extracts text and metadata from the image; and the retrieving of the candidate location from the data source also uses the extracted text and metadata.

In another alternate embodiment the floor counting component may be further operative to determine a number of floors for a building object in the image using a Fourier transform to extract the period of repeating floors for the building object from the image and a floor or a height of the observation point of the image is determined from the number of floors for the building object in the image.

In another alternate embodiment the system may further comprise a landmarks triangulation component operative to identify two or more landmark objects in the image and to triangulate the candidate location of the observation point of the image from the two or more landmark objects in the image In yet another alternate embodiment, a method is provided for identifying a location using image recognition by receiving an unlocated short term rental (STR) query, the unlocated STR query having an unlocated images associated with the unlocated STR; analyzing the unlocated images to assign an unlocated image archetype to each of the unlocated images; retrieving a list of candidate locations from a candidate data source using the unlocated images, each of the candidate locations in the list having a candidate location images, and each of the candidate location images assigned a candidate location image archetype by analyzing each of the candidate location images; comparing the unlocated images and the candidate location images with the same image archetype for generating a total matching score for each of the candidate locations in the list; and presenting though a user interface the list of candidate locations sorted by the total matching score for each of the candidate locations in the list;

In another alternate embodiment, the total matching score for each of the candidate locations may generated by adding together a matching score from the comparison between each of the unlocated images with each of the candidate images with the same image archetype.

According to another embodiment of the invention, there is provided a method of location identification for the short term rental (STR) unit and deduplicating STR data associated with STR listings via image recognition, comprising the steps of: receiving a set of STR images associated with an STR listing; eliminating non-STR images from the STR image data; analyzing each image in the set of STR images with an object detection model, the object detection model applying an object recognition algorithm to detect one or more objects within each image; assigning each image an STR image archetype, the STR image archetypes determined via the one or more objects detected within each image; assigning the STR listing to an STR type, the STR type determined via the combination of STR archetypes assigned to the set of STR images; selecting one or more images based on a combination of the STR type and the STR image archetype for each image; and determining an address for the STR listing by applying an image recognition algorithm one or more of the selected images.

According to a further embodiment, the STR image archetypes may comprise one or more of: Exterior House Front (EHF); Exterior House Rear (EHR); Exterior View Building (EVB); Common Elements (CE); Interior View (IV); View From Unit (VFU), and View From Balcony (VFB). The method may then further comprise associating a specific floor at the address via analysis of images with the STR image archetypes VFU and VFB.

According to further embodiment, the determining step may then comprise identification of two or more known landmarks via the image recognition algorithm and associating the address and the floor based on triangulation from the known landmarks. The known landmarks may comprise one or more of: a building, a road, a rail track, a park, a boat, a vehicle, a mountain, a stadium, an arena and a monument.

According to a further embodiment, the STR type may be selected from one of: a detached house, a semi-detached house, a townhouse, a condominium unit and an apartment.

According to a further embodiment, the one or more objects may comprise: furniture, appliances, fixtures, flooring pattern, carpet, countertops, cabinetry, windows, fences, railings, trees, buildings and roads.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

Other aspects and features according to the present application will become apparent to those ordinarily skilled in the art upon review of the following description of embodiments of the invention in conjunction with the accompanying figures.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Reference will now be made to the accompanying drawings which show, by way of example only, embodiments of the invention, and how they may be carried into effect, and in which:

FIG. 11A is an East-facing VFB view from a building with highlighted landmarks;

FIG. 11B is a top view of a triangulation map based on FIG. 11A;

FIG. 11C is an overhead perspective view based on FIG. 11A;

Like reference numerals indicated like or corresponding elements in the drawings.

DETAILED DESCRIPTION OF THE EMBODIMENTS

The present invention relates generally to a system and method of identifying location, and more particularly to a system and method of identifying location using image recognition. In an aspect of the invention, the system and method provides location identification for short term rental (STR) units, and more particularly to a system and method of identifying a location for an STR unit using image recognition. In this context, the location is preferably a specific unit address, however, it may be a range of addresses or a building address, depending on the information available and the requirements of the system operator.

Figure 1:
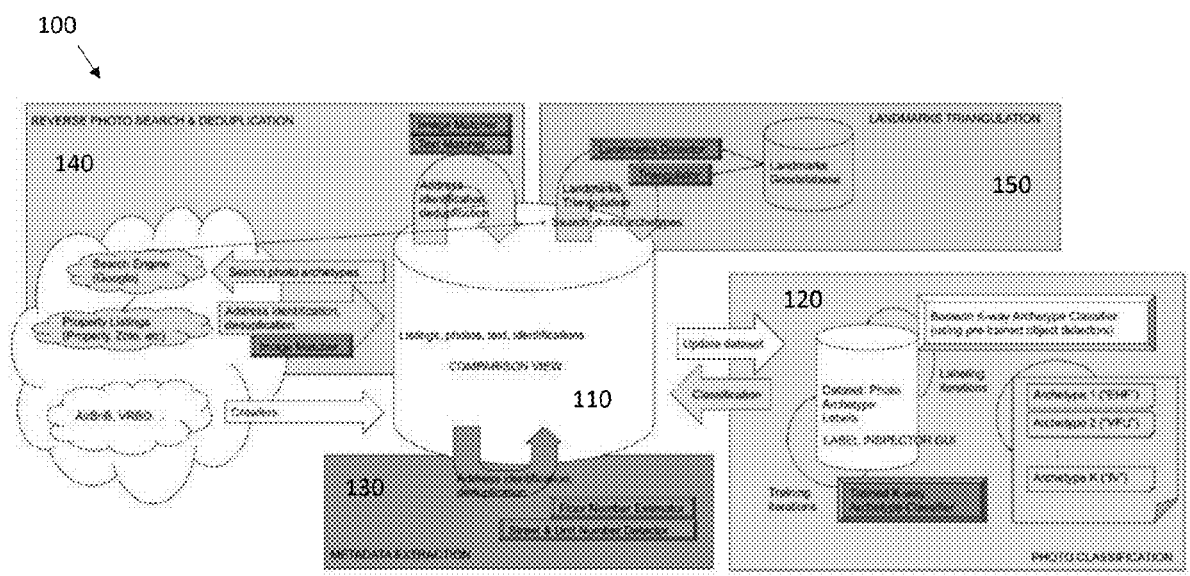
FIG. 1 is a system diagram according to an embodiment.

This system diagram as shown in FIG. 1 depicts the major components of the image recognition and location identification system 100. The components of the system 100 may be implemented in some embodiments as software components or modules or libraries or application programming interfaces (APIs), or in some embodiments as hardware components or sub-systems, the components which may or may not be on the same computer/server or the cloud, and communicate through closed network or Internet or other methods known in the art. Further, some embodiments may be implemented as a combination of the software and hardware as described above.

In an embodiment, the center of the system 100 is the comparison view component 110 which provides a view and interface for comparing image information about an unlocated STR unit to identify the location of the unlocated STR unit. Feeding into the comparison view engine are the photo classification component 120, the metadata extraction component 130, the reverse photo search component 140 and the landmarks triangulation component 150.

The photo classification component 120, is responsible for training the image recognition system and assigning image archetypes as described below. The metadata extraction component 130 determines and assigns location information (address, street name, unit, number, etc.) to images. The reverse photo search component 140 retrieves images through crawling STR databases (e.g. AIRBNB, VRBO, etc.), property listing databases (e.g. MLS, ZOLO, etc.), search engines (e.g. GOOGLE), general image databases (e.g. GOOGLE, TINEYE), and maps (e.g. GOOGLE MAPS, APPLE MAPS) to retrieve images associated with unlocated STRs, located STRs, and property listings (as candidate images). The landmarks triangulation component provides both 2D and 3D triangulation based on landmarks to determine location in images.

The components execute the method of locating unlocated STRs by extracting listing data in the form of text and photos crawled from the web into the comparison view component 110, and each of the other components 120, 130, 140, 150 processing the data according to the functions of each component, and then feeding the updated data back to the comparison view component to enable identification and deduplication of the data and generate location results for the unlocated STRs.

Figure 2:
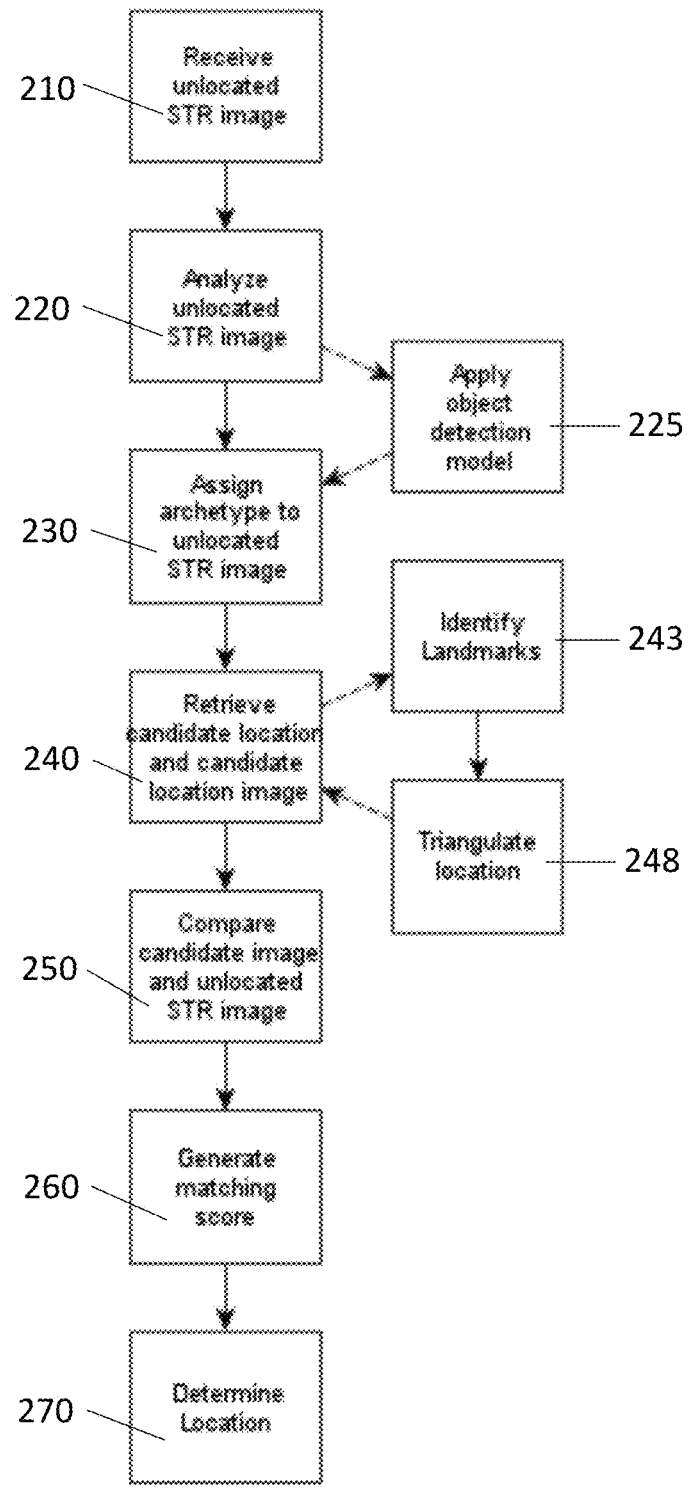
FIG. 2 is a flowchart of the image recognition method according to an embodiment.

According to an embodiment as shown in the process flowchart of FIG. 2, at step 210 a query results in an unlocated short-term rental unit (STR) listing associated with one or more unlocated STR images. The unlocated STR images are then analyzed at step 220 using image recognition and/or an object detection model 225 to assign an image archetype to the unlocated STR images at step 230. By identifying landmarks 243 applying triangulation 248 to the unlocated STR images, a candidate location is then retrieved from a candidate data source at step 240 to provide a candidate location image with the same archetype. The unlocated STR image and the candidate location image with the same archetype are the compared at step 250 to generate a matching score at step 260. If the matching score is over a threshold value, then the candidate location from the candidate location image is associated with the unlocated STR at step 270. Candidate image data sources may include one or more of: a search engine, a reverse image search engine, a real estate website or database, an e-commerce database, a tourism marketing database, a map website or database, a classified ad website or database, or an internal database.

The set of candidate location images for comparison may be determined from data extracted from the unlocated STR unit listing, such as a city, municipality, or other geographically defined region. Alternatively, the latitude and longitude of the search coordinates (GPS coordinate) used in the STR query may be taken directly from the STR listing, or subject to a reverse geocoding API to define a location for the candidate location images. A location range or location area may also be defined directly from the STR listing. Or, a location range or location area (e.g. bounding circle, bounding box) may be defined by the method or system (e.g. 500 m, 1 km, 5 km, 10 km, etc.).

The candidate images may be part of a training set for the machine learning algorithms and process applied in the analysis. In use, the candidate images may be provided directly from a source and/or retrieved from one or more external databases. The classification of both the unlocated STR images and the candidate image into an image archetype enables the reduction and selection of suitable candidate photos.

In an embodiment, the seven (K=7) image archetypes considered are: Exterior House Front (EHF); Exterior House Rear (EHR); Exterior View Building (EVB); Common Elements (CE); Interior View (IV); View From Unit (VFU), and View From Balcony (VFB).

The machine learning framework for image archetype classification is formulated in a technical manner as follows. Given an input image $\Phi$ and K (K=7) archetypes indexed by $1, \ldots, K$, a dataset is used to train a K-way classifier that takes $\Phi$ as input and produces $p1, \ldots, pK$ as output, where pk is the probability that the image $\Phi$ is of archetype k.

The training dataset is a database of images $\Phi1, \ldots, \Phi N$, each of which is assigned a target $0, 1, \ldots, K$ where 0 indicates no archetype and $k=1, \ldots, K$ indicates archetype k. The assignments are either manually assigned or verified by an expert analyst and therefore considered to be "ground truth" targets, and the machine learning objective is to minimize the classification error between the prediction and target.

In an embodiment, at prediction time, the classifier is used to assign at most one archetype to each a unlocated STR image $\Phi$ indicated by a number $0, 1, \ldots, K$. If there is an archetype k such that the probability pk ($\Phi$)>0 for a threshold $\theta$ between 0 and 1, then $\Phi$ is assigned the archetype kmax that has the maximum probability, otherwise $\Phi$ is assigned 0 (no archetype).

The archetype classifier may be trained from the dataset using machine learning algorithms, such as gradient descent on a neural architecture. If the dataset is available and changes in size or nature, the archetype classifier may be retrained on the updated dataset. If the dataset is not available or too small, the archetype classifier may be obtained without a dataset.

In an embodiment, without a dataset, the archetype classifier is produced by exploiting the boolean compositional nature of each of the archetype definitions, that is, in terms of the occurrence of specific items in the image and recognized through object detection such as doors, windows, microwaves, and sofas. In another embodiment, the archetype classifier may be produced by combining the training from the archetype dataset and from the object data model (e.g. Boolean compositional nature of the archetype definitions). In another embodiment, the score from the archetype classifier for each image (i.e. p1 . . . k for each archetype) is used in addition with the score from the archetype classifier based on the object data model (i.e. oM votes in image $\Phi$ for each archetype) to determine the archetype for the input image.

In an embodiment, as a preliminary first step, the images in the image set associated with the unlocated STR are analyzed at a high level to discard any images that exclusively contain non-relevant material, i.e. validating that only images containing outdoor or indoor elements relevant to an STR unit are contained in the image set. Generic images of city skylines or known landmarks may be excluded as part of this process by using image recognition against known stock images.

Next, each image in the image set is subjected to an object detection model which detects one or more known objects within the image according to an object detection algorithm. Based on the final list of detected objects, each image may then be assigned to an STR image archetype.

The detected objects are based on a probability-based assessment of the image by a trained model, with certain objects being considered as higher priority for defining archetypes.

A Boolean composition is developed for each archetype $1, \ldots, K$ based on all detectable objects $o1, \ldots, oM$. Object detection receives an input image and produces an overlay of bounding regions or bounding boxes (rectangular regions) containing object labels associated with a probability score, and may be performed based on recent state-of-the-art neural architectures such as SSD Mobilenet and Inception Resnet trained on the COCO and OpenImages datasets, respectively.

The occurrence of an object oM in an image $\Phi$ votes for one or more archetypes and the baseline composition model includes a complete mapping from each object oM to zero or more archetypes. For example, the detection of a door in $\Phi$ votes for both EHF and EVB archetypes, and $\Phi$ is assigned the archetype that receives the most votes.

Figure 3:
FIG. 3 is an exemplary Exterior House Front (EHF) archetype image.

As described herein, seven STR image archetypes are considered, although other archetypes may be developed, and in different numbers, depending on the nature of the source data and machine learning objectives. Accordingly, in an embodiment, the seven STR image archetypes are:

Exterior House Front (EHF)—A view of the front exterior of the STR unit. The STR unit would typically be a single family dwelling. Such views often have the STR unit center focused with other elements visible in the surroundings. Types of single family dwellings may include a detached house with a driveway and a garage, row-houses with the STR unit in the center, or a secondary dwelling unit detached in a backyard surrounded by grass. An exemplary EHF image is shown in FIG. 3. Objects which may be used to identify this archetype include doors, windows, house numbers, driveways, lawns (grass), and landscaping (trees/bushes). Subsets of this view may include views which focus more narrowly on just the front door and the structure of the house. However, if a limited number of identifiable objects are shown, such as just a door, additional objects or images may be required to confirm the archetype from others such as an Interior View, which also may include a door as an object within the image.

Figure 4A:
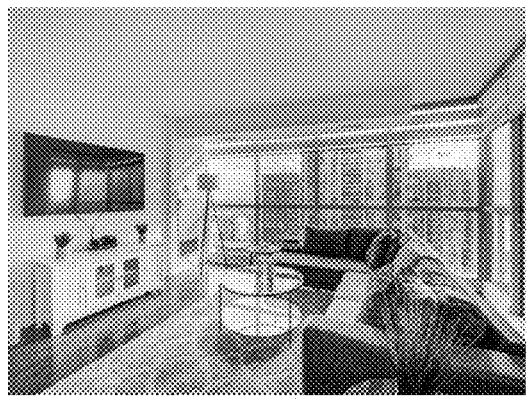
FIGS. 4A-4B are exemplary View From Unit (VFU) archetype images.
Figure 4B:
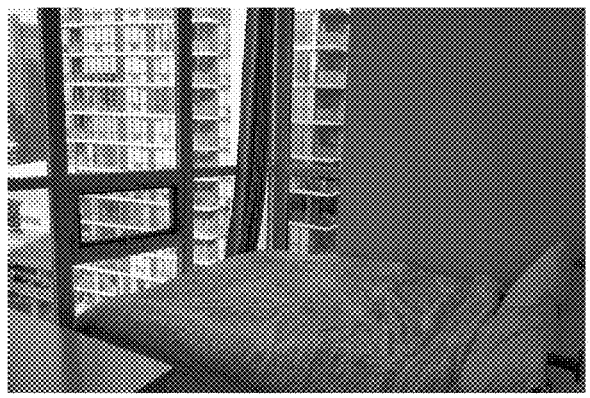

View From Unit (VFU)—A view through a window to the exterior of the STR unit from within the interior of the STR unit. Exemplary VFU images are shown in FIGS. 4A-4B. Objects which may be detected to define this archetype generally include a mix between objects typically found indoors (e.g. couch, TV, table, chair), and objects typically found outdoors (e.g. tree, meadow, bush, animal, buildings).

Figure 5A:
FIGS. 5A-5B are exemplary Exterior House Rear (EHR) archetype images.
Figure 5B:

Exterior House Rear (EHR)—A view of the rear exterior of the STR unit. An exemplary EHR image is shown in FIGS. 5A-5B. Objects which may be detected to define this archetype are generally those found in the backyard space of a detached house, typically the backyard of the house lot, showing part of the dwelling unit including fences (fence lines), decks/patios, outdoor furniture, and landscape elements (trees, bushes) and regional elements, such as cacti in desert setting.

Figure 6:
FIG. 6 is an exemplary Exterior View Building (EVB) archetype image.

Exterior View Building (EVB)—A view from street level to a multi-family dwelling, or building. An exemplary EVB image is shown in FIG. 6. The objects which may be detected to define this archetype include outdoor objects found on streets (bicycles, cars, people, parking meters, trash/recycling bins) with a building or structure being detected in the background, potentially using a subset of objects (doors, pillars, signage) to define the building.

Figure 7A:
FIGS. 7A-7C are exemplary Common Element (CE) archetype images.
Figure 7B:
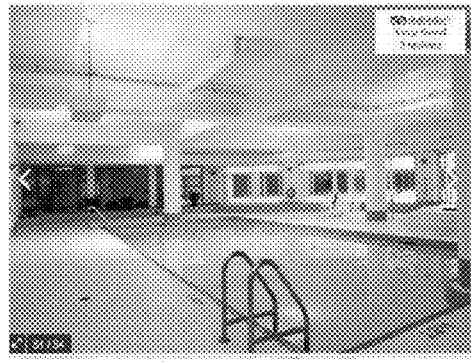
Figure 7C:

Common Elements (CE)—An interior or exterior view depicting common use elements for a building or building complex. Exemplary CE images are shown in FIGS. 7A-7C. The objects detected in this archetype are those found in common or shared use spaces in multi-unit buildings. The objects may then also be used to further define the type of CE space. Typical objects which may be detected may include furniture, swimming pools, security desk (lobby), billiard table (games room), exercise equipment (gym), and landscaping (patio).

Figure 8:
FIG. 8 is an exemplary Interior View (IV) archetype image.
Figure 9A:
FIGS. 9A-9F are exemplary View From Balcony (VFB) archetype images.
Figure 9B:
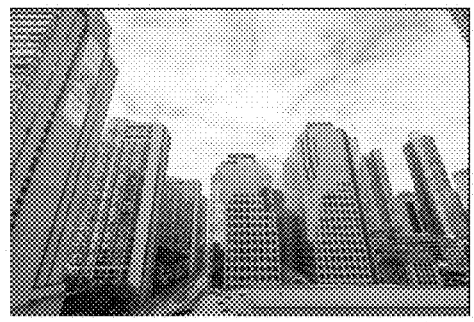
Figure 9C:
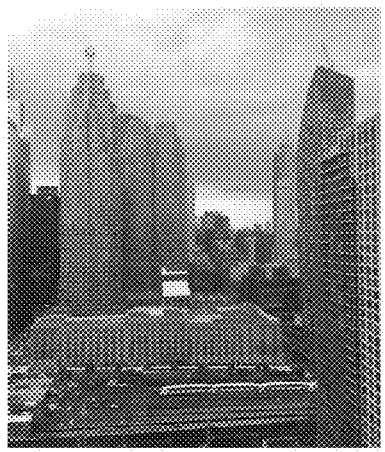
Figure 9D:
Figure 9E:
Figure 9F:
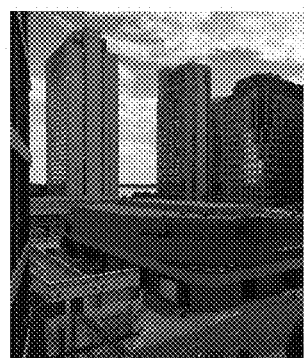

Interior View (IV)—A view of the interior of the STR unit without any exterior views. An exemplary IV image is shown in FIG. 8. Objects which may be detected to define this archetype are those objects that are typically found only on the inside of an STR unit (appliances, furniture, light fixtures, personal objects) and the list of detected objects is composed entirely or essentially entirely of these objects.

View From Balcony (VFB)—A view from a balcony or exterior deck comprising multiple external objects. Exemplary VFB images are shown in FIGS. 9A-9F. Objects which may be detected may include (multiple) buildings, the horizon, balcony elements (railings), and city-specific landmarks such as arenas, stadiums, monuments, parks, and iconic structures. VFB images may also be subjected to further analysis as discussed below.

Some images may lack sufficient objects to be assigned to an archetype. Such images may be discarded from further analysis (either temporary or permanently).

The list of archetypes defined in the set of unlocated STR images may then be used to define or classify the unlocated STR unit to an STR dwelling unit type based on the combination of archetypes found. For example, if only images from the EHF, EHR and IV archetypes are found, then the STR dwelling unit type is classified as a detached (residential) house. Where the VFU, VFB, EVB, IV and CE archetypes are found, then the STR dwelling unit type is classified as a condo (apartment). The combination of EHF, EHR, IV and CE archetypes may be classified as a villa. The detected objects may be applied as well. For example, where a canoe or dock is found as an object, the STR dwelling unit type may be classified as a cottage, as opposed to a standard house or villa. A partial list of possible dwelling unit types may include common dwelling unit types such as a detached house, a semi-detached house, a townhouse, a condominium unit and an apartment, as well as more specific dwelling unit types, such as a villa, cottage, hostel, hotel, RV, trailer, tent, and yurt.

In an embodiment, with the STR dwelling unit type assigned to the unlocated STR unit, one or more of the unlocated STR images is then subject to application of an image recognition algorithm for comparison with candidate images of the same archetype to determine location for association with the STR unit. As many images may be used as are needed to provide the desired confidence level for the location determination.

For example, where the STR dwelling unit type is a detached house, one or more of the images may be matched against a known image from a database where the known image has a confirmed address associated with it. The database may be internal (generated from past assessments or neighborhood canvassing) or external, as needed. For example, an EHF archetype image may be matched against a street view provided by neighborhood canvassing, or from an external map database, or from a real estate listing database. Note, the external map database and the real estate listing will have complete information on the location of the dwelling unit that is providing the images. If no known image match is found, further analysis of the image may be undertaken to find relevant data to attempt to identify the location. Alternatively, additional images may be analyzed as described below, and that result may then be associated with the image for future reference.

As another example, EVB and CE archetype images may be matched against promotional images for multi-resident buildings or complexes. This step may further include image watermark tracing and/or metadata tracing to link the image with an original image from another source from which the building and/or floor information may be retrieved. However, for these images, while it may be possible to identify a specific building address, it may not be possible to identify the specific unit address, however, the building address may still be deemed as sufficient detail for the STR unit location. If not, further analysis may be undertaken, one version of which is discussed below.

Similarly, VFU and VFB archetype images may be matched against a database (internal or external) of images of known skylines and/or landmarks to attempt to determine the building address or reduce the range of possible building addresses. As with the EVB and CE archetypes, the results may be limited to a specific building address, and further analysis required to determine a more specific unit address or ranges of addresses.

In an embodiment, a location can be an address with street number and street name. In another embodiment, a location can also be a building number, street name, and a unit number. In another embodiment, the location can be a 2D location on a map. In another embodiment, the location can also be a 3D location for a unit (e.g. unit number including floor or height) in a building on a map.

At this stage, it is possible that sufficient information cannot be extracted from the images. For example, the image may include multiple condominium buildings, and lack details that may be applied to identify the specific building associated with the STR unit. In this case, the image may be discarded, or may be flagged for further analysis, either via a separate machine learning algorithm, or with human intervention. If human intervention is needed, it is solely to identify and/or classify objects within the image for further training of the machine learning classifier. Images which are successfully re-analyzed may then be fed back as part of the machine learning process to improve the quality of the "ground truth".

As mentioned above, where the STR dwelling unit type is a condo/apartment unit, it may further require a floor and/or unit number in addition to the building number for a complete address. Where this information is not found in the image matching databases, further analysis may be applied to specific images to determine this information. Accordingly, a VFB or VFU archetype image may provide sufficient data to extrapolate the floor and/or unit number via image recognition and triangulation algorithms. Based on the observation viewpoint of the image and the methods discussed below, it may be possible to assign a floor number to the unlocated STR unit and, in optimal cases, a unit number.

For example, aspects of perspective and parallax may be applied to the image horizon (if visible) to extrapolate the height of the view (observation point) in the image, and correspondingly, determine the floor of the building associated with the VFB image. Alternatively, edge detection algorithms may be applied to neighboring buildings shown in the image, and then counting floors based on standard floor heights and visually contrasting elements between floors.

A method is described below for counting floors of buildings appearing in VFB and some VFU (e.g. living room with floor-to-ceiling windows like FIG. 4A) archetype photos, specifically STR photos that are characterized by the occurrence of high-rise buildings such as office or residential towers, typically occupying a small fraction of all image pixels, whose appearance may or may not include floor-to-ceiling glass and may or may not include balconies. In another embodiment, a floor counting component counts floors of buildings appearing in VFB and some VFU archetype photos. In further embodiments, the counting of floors by the method and system may be performed on all or some of the archetype photos.

A building segmentation algorithm is run on the photo to remove non-building image pixels and to enumerate buildings and identify the pixels of each building. For example, a recent state-of-the-art algorithm may be used such as the Resnet50dilated trained on ADE20k.

Figure 10A:
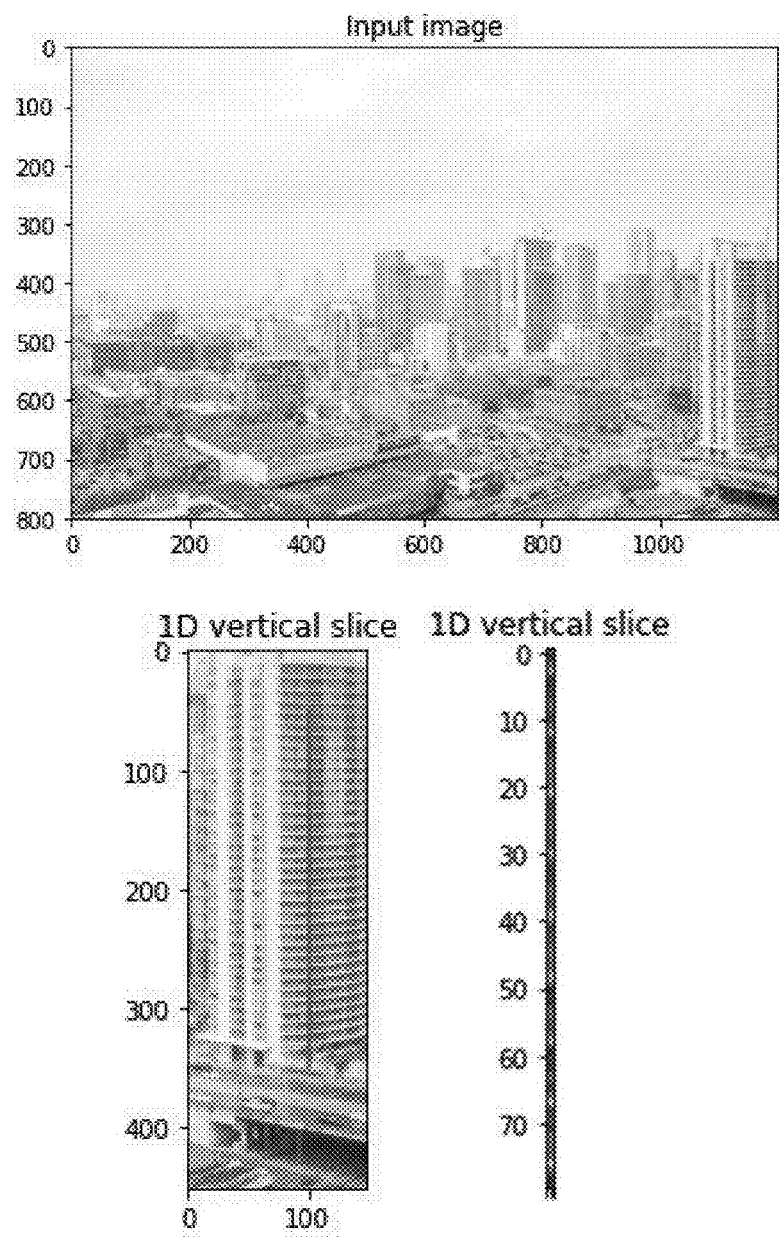
FIGS. 10A-10D illustrate a process of floor counting using frequency detection.
Figure 10B:
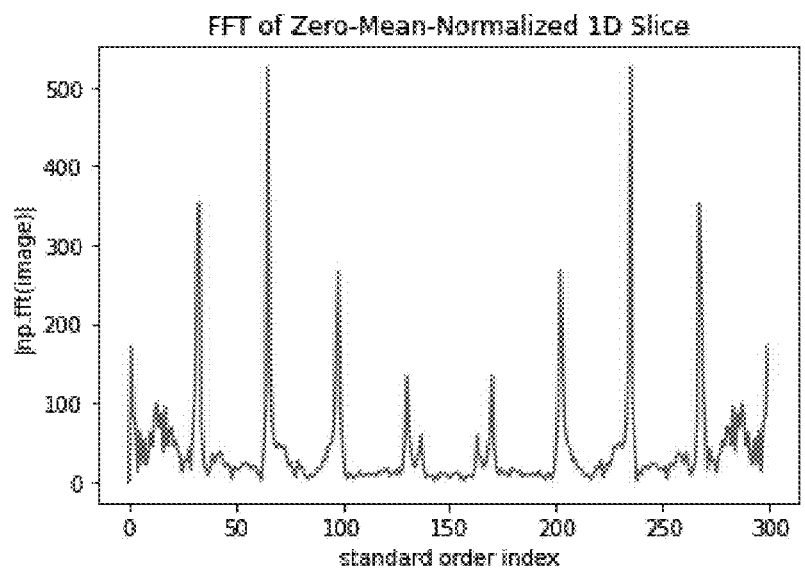

The discrete Fourier transform (DFT) is applied along the vertical extent of a building (FIG. 10A) to extract the period of repeating floors as a sinusoidal signal (FIG. 10B). A standard algorithm such as the fast Fourier transform (FFT) may be used. The resulting frequencies with the top M amplitudes, such as M=3, are taken and converted back into image pixel space for verification.

Figure 10C:
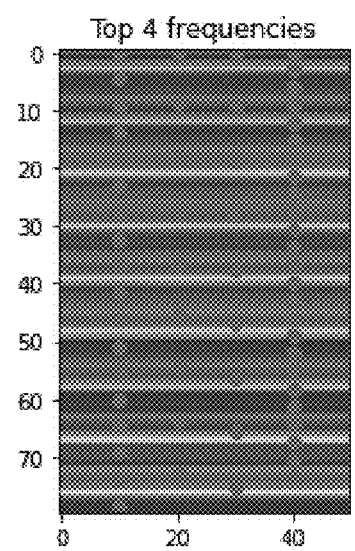

In an embodiment, verification (FIG. 10C) is required to check that the sinusoidal frequency is detecting floors and nothing more, such as balconies. For example, the strongest frequency may peak twice per floor, while the second and third strongest frequencies may peak once per floor with a difference in phase shift.

Figure 10D:
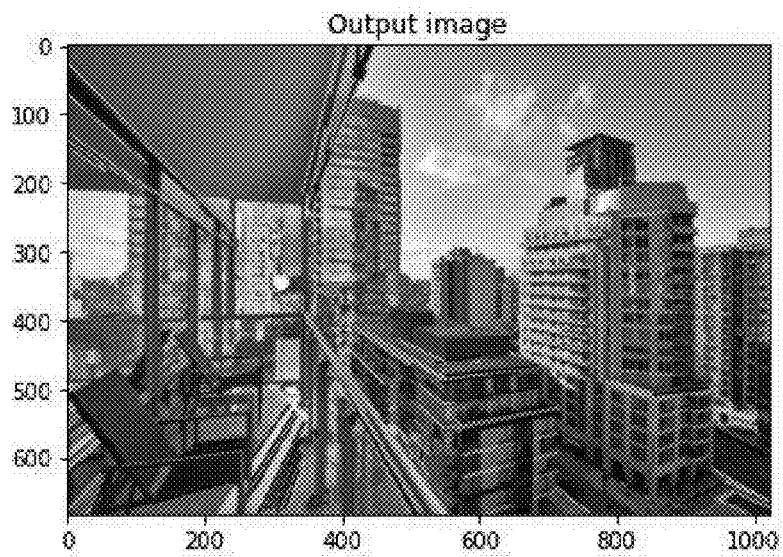

The number of peaks of the frequency and/or the verified frequency is counted within the vertical extent of the building up to the detected horizon line (FIG. 10D). And, in an embodiment where multiple buildings are shown in the image, the frequency and/or the verified frequency may then be aggregated over all segmented buildings, such as by averaging or mean shift. In an embodiment, the number of peaks counted is the number of floors.

Another approach is to identify landmarks shown in the VFB image and applying triangulation to determine the location of the building. Such landmarks may include other buildings, a road, a rail tack, a park, a stadium, an arena, or a monument. As shown in FIGS. 11A and 11B, an East-facing VFB image (FIG. 11A) includes two visible buildings as marked. These buildings may be identified and located on a map as shown in FIG. 11B and triangulated back to determine the origin building for the view. Specific buildings in an area may be flagged as distinctive or iconic and more readily identified within an image. These specific buildings are then preferred for use as map locations to perform the triangulation process. Dimensions and distances may be determined based on the perspective shown in the image, combined with known building data, such as standard floor heights or standard window dimensions. Where a full building is visible in the image, the known height of the building may be used as well. The height of the building may be extracted from public records and/or a database. The height of the building may be calculated by counting the number of floors using the floor counting method above.

There are 2 candidate buildings that could have reproduced the images in the view. Further building geometric analysis shows that the balcony on the right side apparently orthogonal to the balcony from which the photo was taken in FIG. 11A, could only have come from the building in the lower left of FIG. 11B (lower part of FIG. 11C) and not from the building in the lower right of FIG. 11B (upper part of FIG. 11C). The correct building in FIG. 11C has concordance with the 2 landmarks (landmark 1 on-page and landmark 2 off-page) from 2 distinct locations that contain a third balcony consistency as shown on the right side of FIG. 11A. This process is combining 3D geometric analysis, with 2D geographic surveying techniques.

Figure 12A:
FIG. 12A a North-facing VFB view from the building of FIG. 11A with highlighted landmarks.
Figure 12B:
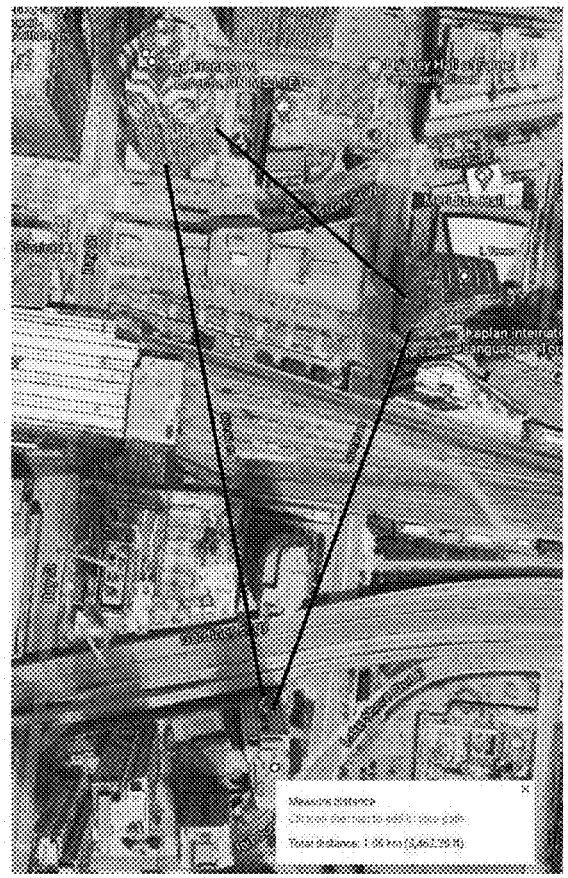
FIG. 12B is a top view of a triangulation map based on FIG. 12A.
Figure 12C:
FIGS. 12C-12D are alternate views of FIG. 12A.
Figure 12D:

Similarly, FIGS. 12A and 12B show a North-facing VFB image view from the same building. Again, two buildings are visible as marked in FIG. 12A and can be triangulated according to FIG. 12B. The unique curvilinear shape of the right-hand side building of FIG. 12A has a face that presents a unique angle normal to the building's observation point consistent with the right side of FIG. 12C. The unique tower geometry of the left-hand side building of FIG. 12A has a face that presents a unique angle normal to the building's observation point consistent with the left side of FIG. 12C. The competing building to the left hand side in FIG. 12B does not have the same angle of building faces normal to the observation point (modeled view in FIG. 12D). This process is combining 3D vector modeling analysis, with 2D geographic surveying techniques.

Figure 13A:
FIG. 13A a South-facing VFB view from the building of FIG. 11A with highlighted landmarks.
Figure 13C:
FIG. 13C is an alternate view of FIG. 13A.
Figure 13B:
FIG. 13B is a top view of a triangulation map based on FIG. 13A.

Also, similarly, FIGS. 13A and 13B show a South-facing VFB image view from the same building. Again, two buildings as marked in FIG. 13A are triangulated in FIG. 13B. The building's unique geometry on the left side of FIG. 13A presents a unique face normal to the observation point in the left side of FIG. 13C. The building's unique geometry on the right side of FIG. 13A presents a unique face normal to the observation point in the right side of FIG. 13C. FIG. 13B includes each respective building and the observation point of FIG. 13A. The competing building to the lower left of FIG. 13B does not have the same 2 building faces from the 2 landmark buildings of FIG. 13A normal to it.

Figure 14A:
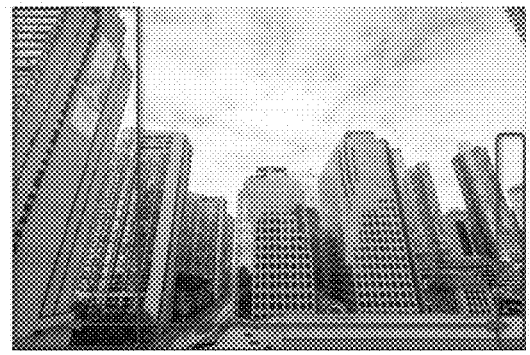
FIG. 14A is a West-facing VFB view from the building of FIG. 11A with highlighted landmarks.
Figure 14B:
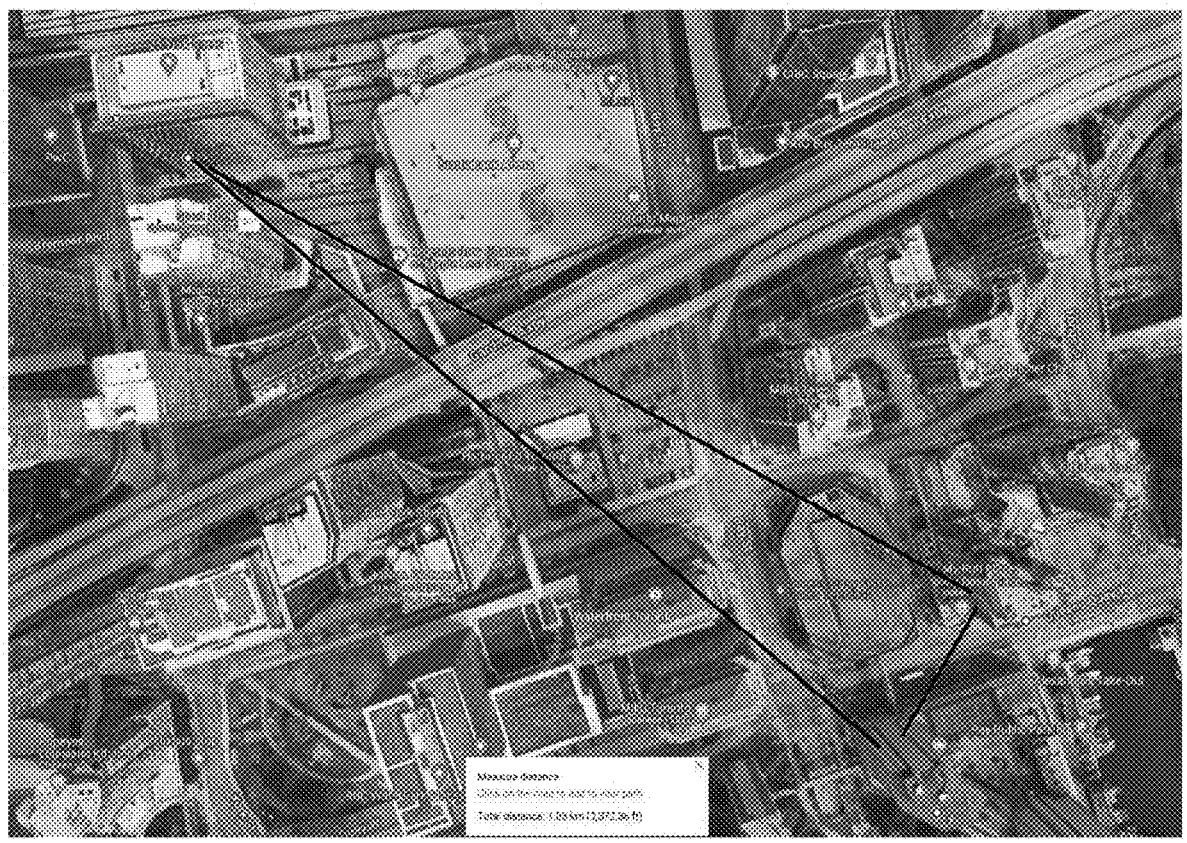
FIG. 14B is a top view of a triangulation map based on FIG. 14A.
Figure 14C:
FIGS. 14C-14D are alternates views of FIG. 14A.
Figure 14D:
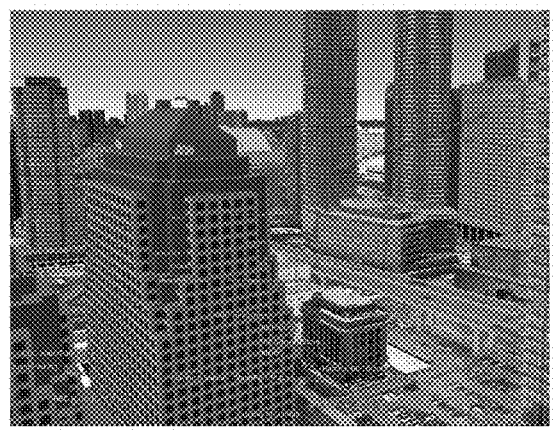

Finally, FIGS. 14A and 14B show a West-facing VFB image view from the same building. Notably in this view, the two farthest left and right buildings are selected as marked in FIG. 14A and triangulated in FIG. 14B. The left-hand side building in FIG. 14A is the same building face shown in FIG. 14C normal to the observation point. The right-hand side building in FIG. 14A (with the "Telus" signage) is the same building face shown in FIG. 14D normal to the observation point. Both landmarks showing simultaneously could only have come from the building making the third vertex of FIG. 14B, and not any competing building, as it would be impossible to fit such buildings in the field of view. However, given the large number of buildings shown in the view, other landmarks may be chosen depending on which buildings are most easily identified, as discussed above, or if needed for greater accuracy.

In further embodiments, referring again to FIGS. 11A and 11B, a highway is shown marked between the two buildings. Similarly, a series of rail tracks is visible in FIGS. 12A and 12B. These types of landmarks (as well as rivers, coastlines, etc.) are considered as continuous landmarks as opposed to fixed landmarks such as buildings, stadiums and monuments. The continuous landmarks may also be used to determine floor and directional facing, as well as assisting in locating other landmarks on the map for triangulation purposes.

In an embodiment, the location and floor information (where present) associated with the image(s) are then applied to a parcel checking engine, where the information is validated against the parcel of land associated with the image. This process may vary based on the density of the area (i.e. suburban vs. high-density urban). Where a parcel register is defined as the official government record containing a property's details such as a property identification number and legal description of the property (e.g. location and boundaries).

In an embodiment, the unlocated STR image may then be compared against one or more candidate images to generate a matching score for each of the candidate locations associated with the candidate images. In an embodiment, the highest matching score (over a minimum threshold) may be selected and the candidate location assigned to the unlocated STR.

In another embodiment, where multiple candidate images are above the minimum matching score threshold, and thus multiple candidate locations are possible, the list of potential candidate locations may be presented through a user interface, preferably sorted by matching score.

Rather than a single matching score derived from a single unlocated image, a total matching score may be generated using multiple unlocated images and multiple candidate images. In this case, the total matching score above a minimum threshold may be used to assign a location to the unlocated STR as described above.

According to an embodiment of the invention, there is provided a method of location identification for short term rental (STR) unit and deduplicating STR data associated with STR listings via image recognition, comprising the steps of: receiving a set of STR images associated with an STR listing; eliminating non-STR images from the STR image data; analyzing each image in the set of STR images with an object detection model, the object detection model applying an object recognition algorithm to detect one or more objects within each image; assigning each image an STR image archetype, the STR image archetypes determined via the one or more objects detected within each image; assigning the STR listing to an STR type, the STR type determined via the combination of STR archetypes assigned to the set of STR images; selecting one or more of the each images based on a combination of the STR type and the STR image archetype for each image; and determining an address for the STR listing by applying an image recognition algorithm on one or more of the selected images.

According to a further embodiment, the STR image archetypes may comprise one or more of: Exterior House Front (EHF); Exterior House Rear (EHR); Exterior View Building (EVB); Common Elements (CE); Interior View (IV); View From Unit (VFU), and View From Balcony (VFB). The method may then further comprise associating a specific floor at the address via analysis of images with the STR image archetypes VFU and VFB.

In a further embodiment, the determining step may then comprise identification of two or more known landmarks via the image recognition algorithm and associating the address and the floor based on triangulation from the known landmarks. The known landmarks may comprise one or more of: a building, a road, a rail track, a park, a stadium, an arena and a monument.

According to a further embodiment, the STR type is selected from one of: a detached house, a semi-detached house, a townhouse, a condominium unit and an apartment.

According to a further embodiment, the one or more objects may comprise: furniture, appliances, fixtures, flooring pattern, carpet, countertops, cabinetry, windows, fences, railings, trees, buildings and roads.

It should also be noted that the steps described in the method of use can be carried out in many different orders according to user preference. The use of "step of" should not be interpreted as "step for", in the claims herein and is not intended to invoke the provisions of 35 U.S.C. § 112(f). It should also be noted that, under appropriate circumstances, considering such issues as design preference, user preferences, marketing preferences, cost, structural requirements, available materials, technological advances, etc., other methods are taught herein.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

The present invention may be embodied in other specific forms without departing from the spirit or essential characteristics thereof. Certain adaptations and modifications of the invention will be obvious to those skilled in the art. Therefore, the presently discussed embodiments are considered to be illustrative and not restrictive, the scope of the invention being indicated by the appended claims rather than the foregoing description and all changes which come within the meaning and range of equivalency of the claims are therefore intended to be embraced therein.

The invention claimed is:

1. A method for determining a location of an unlocated short term rental (STR) using image recognition, comprising:
   receiving an unlocated STR query, the unlocated STR query having an unlocated image associated with the unlocated STR;
   analyzing the unlocated image with image recognition to assign an unlocated image archetype to the unlocated image;
   retrieving a list of candidate locations from a candidate data source using the unlocated image, each of the candidate locations having an associated candidate location image, and the candidate location image being assigned a candidate location image archetype by analyzing the candidate location image;
   comparing the unlocated image and the candidate location image in response to the archetype of the unlocated image being the same as the archetype of the candidate location image for generating a matching score;
   determining the location of the unlocated STR by associating the candidate location with the unlocated image when the matching score is over a threshold.

2. The method of claim 1, wherein the step of analyzing the unlocated image further comprises assigning the archetype of the unlocated image by classifying the unlocated image using a machine learning framework for image archetype classification.

3. The method of claim 1, wherein the step of analyzing the unlocated image further comprises:
   analyzing the unlocated image with an object detection model, the object detection model for applying an object recognition algorithm to detect one or more objects within the unlocated image; and
   assigning an archetype to the unlocated image based on the detected objects within the unlocated image.

4. The method of claim 1, wherein the unlocated STR query further contains an initial longitudinal and latitudinal search coordinate, and an area of search related to the initial search coordinate; and
   further wherein the candidate locations retrieved are limited to locations within the area of search.

5. The method of claim 4, further comprising retrieving an initial candidate location through a reverse geocoding application programming interface (API) and the initial search coordinate;
   wherein the candidate locations retrieved from the data source also uses the initial candidate location.

6. The method of claim 1, further comprising determining a dwelling unit type of the unlocated STR query from the archetype assigned to the unlocated image;
   wherein the candidate locations retrieved are limited to the candidate locations with the same candidate dwelling unit type.

7. The method of claim 1, further comprising extracting text and metadata from the unlocated image;
   wherein the candidate locations retrieved from the data source also uses the extracted text and metadata.

8. The method of claim 1, further comprising determining a number of floors for a building object in the unlocated image by using a Fourier transform to extract the period of repeating floors for the building object from the unlocated image;
   wherein a floor or a height of the observation point of the unlocated image is determined from the number of floors for the building object in the unlocated image.

9. The method of claim 1, further comprising:
   identifying two or more landmark objects in the unlocated image; and
   triangulating each of the candidate locations of the unlocated image from the two or more landmark objects in the unlocated image.

10. A system for determining a location of an unlocated short term rental (STR) using image recognition, comprising:
    a comparison view component operative to provide a view and interface for comparing image information about an unlocated STR unit and to identify a location for the unlocated STR unit, wherein the comparison view component receives an unlocated STR query, the unlocated STR query having an unlocated image associated with the unlocated STR;
    a photo classification component operative using image recognition to analyze the unlocated image to assign an unlocated image archetype to the unlocated image;
    a reverse photo search component to retrieve images and;
    wherein the system is operative to retrieve a list of candidate locations from a candidate data source using the unlocated image, each of the candidate locations having an associated candidate location image, and the candidate location image being assigned a candidate location image archetype by analyzing the candidate location image;
    wherein the system is further operative to compare the unlocated image and the candidate location image in response to the archetype of the unlocated image being the same as the archetype of the candidate location image for generating a matching score; and
    wherein the system is operative to determine a location of the unlocated STR by associating the candidate location with the unlocated image when the matching score is over a threshold.

11. The system of claim 10, wherein the photo classification component is further operative to assign the archetype of the unlocated image by classifying the unlocated image using a machine learning framework for image archetype classification.

12. The system of claim 10, wherein the photo classification component further comprises an object detection model for applying an object recognition algorithm to detect one or more objects within the unlocated image and assigning an archetype to the unlocated image based on the detected objects within the image.

13. The system of claim 10, wherein the unlocated STR query further contains an initial longitudinal and latitudinal search coordinate, and an area of search related to the initial search coordinate; and
    further wherein the candidate locations retrieved are limited to locations within the area of search.

14. The system of claim 13, further comprising retrieving an initial candidate location through a reverse geocoding application programming interface (API) and the initial search coordinate;
    wherein the candidate locations retrieved from the data source also uses the initial candidate location.

15. The system of claim 10, further comprising determining a dwelling unit type of the unlocated STR query from the archetype assigned to the unlocated image;
    wherein the candidate locations retrieved are limited to the candidate locations with the same candidate dwelling unit type.

16. The system of claim 10, further comprising a metadata extraction component operative for assigning location information to unlocated images;

wherein the system extracts text and metadata from the unlocated image; and the retrieving of the candidate locations from the data source also uses the extracted text and metadata.

17. The system of claim 10, wherein the floor counting component is further operative to determine a number of floors for a building object in the unlocated image using a Fourier transform to extract the period of repeating floors for the building object from the unlocated image;
wherein a floor or a height of the observation point of the unlocated image is determined from the number of floors for the building object in the unlocated image.

18. The system of claim 10, further comprising a landmarks triangulation component operative to identify two or more landmark objects in the unlocated image and to triangulate each of the candidate locations of the observation point of the unlocated image from the two or more landmark objects in the unlocated image.

19. A method for determining a location of an unlocated short term rental (STR) using image recognition, comprising:
receiving an unlocated STR query, the unlocated STR query having unlocated images associated with the unlocated STR;
analyzing the unlocated images using image recognition to assign an unlocated image archetype to each of the unlocated images;
retrieving a list of candidate locations from a candidate data source using the unlocated images, each of the candidate locations in the list having an associated candidate location image, and each of the candidate location images being assigned a candidate location image archetype by analyzing each of the candidate location images;
comparing the unlocated images and the candidate location images in response to the archetype of one of the unlocated images being the same as the archetype of one of the candidate location images for generating a total matching score for each of the candidate locations in the list; and
presenting through a user interface the list of candidate locations sorted by the total matching score for each of the candidate locations in the list.

20. The method of claim 19, further wherein the total matching score for each of the candidate locations is generated by adding together a matching score from the comparison between each of the unlocated images with each of the candidate images with the same image archetype.

\* \* \* \* \*